United States Patent
Gurumoorthy et al.

(10) Patent No.: US 12,035,394 B2
(45) Date of Patent: Jul. 9, 2024

(54) MULTI-SUBSCRIBER IDENTITY MODULE CAPABILITY SIGNALING FRAMEWORK

(71) Applicant: Apple Inc., Cupertino, CA (US)

(72) Inventors: Sethuraman Gurumoorthy, San Ramon, CA (US); Fangli Xu, Beijing (CN); Adesh Kumar, San Jose, CA (US); Birgit Breining, Munich (DE); Dawei Zhang, Saratoga, CA (US); Haijing Hu, Los Gatos, CA (US); Longda Xing, San Jose, CA (US); Naveen Kumar R. Palle Venkata, San Diego, CA (US); Srirang A. Lovlekar, Fremont, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,836

(22) PCT Filed: Oct. 22, 2020

(86) PCT No.: PCT/CN2020/122658
§ 371 (c)(1),
(2) Date: Sep. 24, 2021

(87) PCT Pub. No.: WO2022/082556
PCT Pub. Date: Apr. 28, 2022

(65) Prior Publication Data
US 2023/0254918 A1 Aug. 10, 2023

(51) Int. Cl.
*H04W 88/06* (2009.01)
*H04W 8/24* (2009.01)
(Continued)

(52) U.S. Cl.
CPC ............. *H04W 76/15* (2018.02); *H04W 8/24* (2013.01); *H04W 60/00* (2013.01); *H04W 68/005* (2013.01); *H04W 88/06* (2013.01)

(58) Field of Classification Search
CPC ..... H04W 88/06; H04W 8/24; H04W 68/005; H04W 76/15; H04W 60/00
See application file for complete search history.

(56) References Cited

U.S. PATENT DOCUMENTS 10,623,946 B1 * 4/2020 Kumar ................. H04W 76/16
10,701,548 B1    6/2020 Sevindik
(Continued)

FOREIGN PATENT DOCUMENTS

CN       111355515 A        6/2020
WO   WO-2021020190 A1 *   2/2021    ............ H04W 60/04

OTHER PUBLICATIONS

3rd Generation Partnership Project; Technical Specification Group Services and System Aspects ; Study on system enablers for devices having multiple Universal Subscriber Identity Modules (USIM) (Release 17), 3GPP TR 23.761 v1.0.0, Sep. 2020 (Year: 2020).*
(Continued)

*Primary Examiner* — Jinsong Hu
*Assistant Examiner* — Farideh Madani
(74) *Attorney, Agent, or Firm* — Blank Rome LLP

(57) ABSTRACT

A technique for determining that a wireless device supports using multiple subscriber identity module (SIM) cards to establish multiple connections to wireless networks, generating a multi-SIM capability message, and transmitting the multi-SIM capability message to a first wireless network. In another aspect, a technique for a wireless system to receive a multi-SIM capability message from a wireless device, determine a connection configuration of the wireless device based on the received multi-SIM capability message, and
(Continued)

transmit an indication of the configured connection to the wireless device.

19 Claims, 14 Drawing Sheets

(51) Int. Cl.
*H04W 60/00* (2009.01)
*H04W 76/15* (2018.01)
*H04W 68/00* (2009.01)

(56) References Cited

U.S. PATENT DOCUMENTS

| | | |
|---|---|---|
| 2016/0219648 A1 | 7/2016 | Awoniyi-Oteri |
| 2018/0115392 A1* | 4/2018 | Yang .................... H04W 24/02 |
| 2021/0022111 A1* | 1/2021 | Kumar ................... H04W 8/24 |
| 2021/0120524 A1* | 4/2021 | Palle .................. H04W 68/005 |

OTHER PUBLICATIONS

"3rd Generation Partnership Project; Technical Specification Group Services and System Aspects ; Study on system enablers for devices having multiple Universal Subscriber Identity Modules (USIM) (Release 17)," 3GPP TR 23.761 v1.0.0, Sep. 2020.

Huawei, et al., "KI#1 KI#3, New Col: N3GPP for MUSIM Service Concurrency," 3GPP TSG-WG SA2 Meeting #139E e-meeting, S2-2003975, May 22, 2020, XP051889982, Retrieved from the Internet: URL: https://ftp.3gpp.org/tsg_sa/WG2_Arch/TSGS2_139e_Electronic/Docs/S2-2003975.zip [retrieved on May 22, 2020].

Nokia, et al., "Overall MUSIM interim conclusions proposal," 3GPP TSG SA WG2 Meeting #141-e, S2-2007469, Oct. 2, 2020, XP051938508, Retrieved from the Internet: URL: https://ftp.3gpp.org/tsg_sa/WG2_Arch/TSGS2_141e_Electronic/Docs/S2-2007469.zip [retrieved on Oct. 2, 2020].

Apple, "R17 Multi-SIM," 3GPP TSG RAN Meeting #85, RP-192175, Sep. 9, 2019 (Sep. 9, 2019).

CATT, "Update of solution: RAN based paging collision avoidance for NR," SA WG2 Meeting #S2-136, S2-1911066, Nov. 8, 2019 (Nov. 8, 2019).

* cited by examiner

MULTI-SUBSCRIBER IDENTITY MODULE CAPABILITY SIGNALING FRAMEWORK

FIELD

The present application relates to wireless devices and wireless networks including devices, computer-readable media, and methods for implementing a framework for Multiple Universal Subscriber Identity Module (MUSIM) capability signaling.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Aspects relate to devices, computer-readable media, and methods for a wireless device capable of determining that the wireless device supports using multiple subscriber identity module (SIM) cards to establish multiple connections to wireless networks, generating a multi-SIM capability message, and transmitting the multi-SIM capability message to a first wireless network.

Aspects also relate to devices, computer-readable media, and methods for a wireless system capable of receiving a multi-SIM capability message from a wireless device, determining a connection configuration of the wireless device based on the received multi-SIM capability message, and transmitting an indication of the configured connection to the wireless device.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings.

Figure 1:
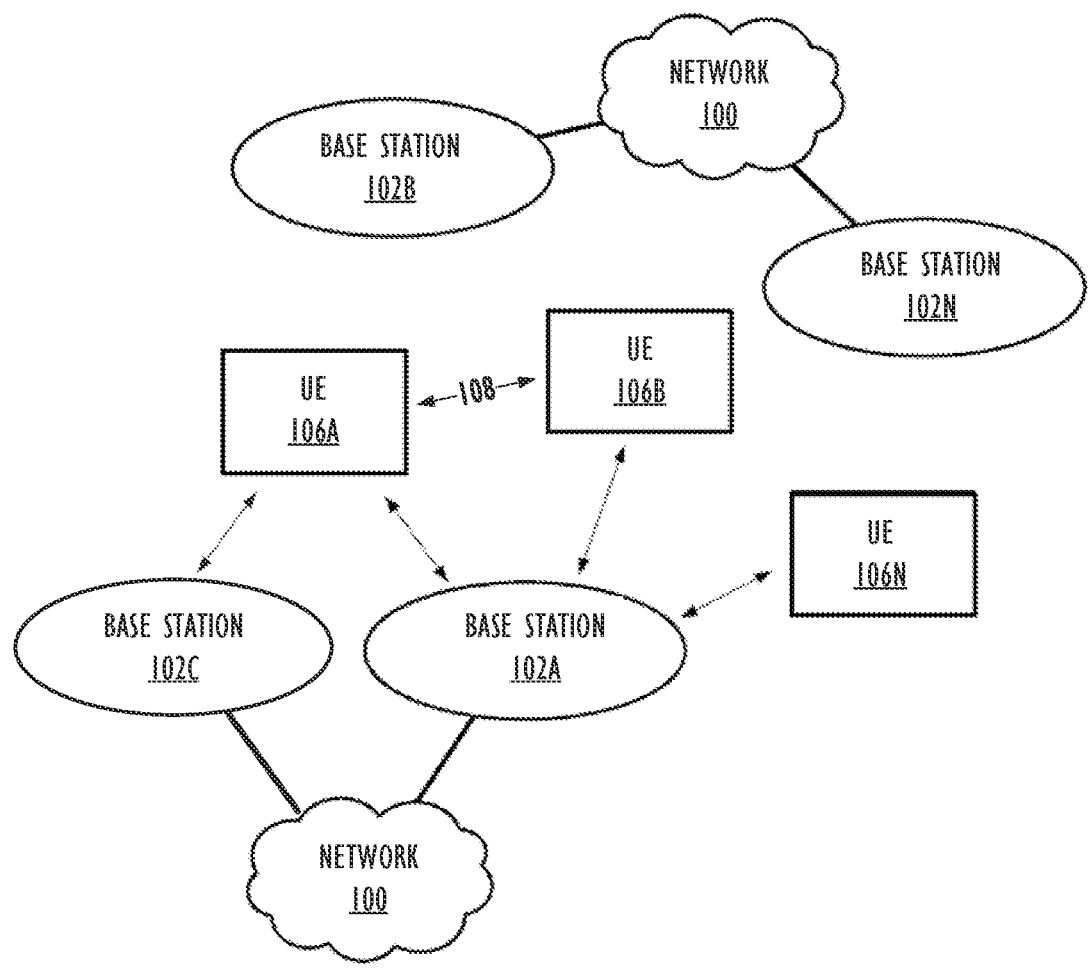
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In certain wireless communications systems, a wireless device may support multiple SIM cards, allowing the wireless device to maintain multiple wireless connections using the SIM cards. In some cases, the multiple wireless connections may have conflicting configurations for the wireless device, or the configurations may be optimized to improve performance, such as battery life, of the wireless device. What is needed is a framework for multi-SIM capability signaling for a wireless device to indicate to the wireless network that the wireless device supports multiple SIM cards and that a reconfiguration is desired.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device, a computer system memory or random access memory such as DRAM, DDR RAM, SRAM, EDO RAM. Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays). PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (also "User Device" or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™. Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, etc. In general, the term "UE" or "UE device" can be broadly defined to encompass any electronic, computing, and/or telecommunications device (or combination of devices) which is transportable by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "base station" or "wireless station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE. LTE-Advanced (LTE-A), 5G new radio (5G NR). HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some embodiments, the UEs 106 may be IoT UEs, which may comprise a network access layer designed for low-power IoT applications utilizing short-lived UE connections. An IoT UE can utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a PC5 interface for direct communications between devices. The IoT UEs may also execute background applications (e.g., keep-alive messages, status updates, etc.) to facilitate the connections of the IoT network.

As shown, the UEs 106, such as UE 106A and UE 106B, may directly exchange communication data via a PC5 interface 108. The PC5 interface 105 may comprise one or more logical channels, including but not limited to a physical sidelink shared channel (PSSCH), a physical sidelink control channel (PSCCH), a physical sidelink shared channel (PSSCH), a physical sidelink downlink channel (PSDCH), a physical sidelink broadcast channel (PSBCH), and a physical sidelink feedback channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
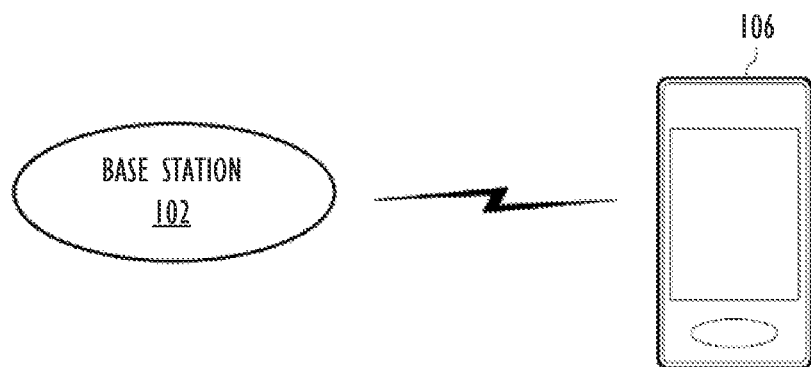
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some embodiments, a downlink resource grid can be used for downlink transmissions from any of the base stations 102 to the UEs 106, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher-layer signaling to the UEs 106. The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Example Communication Device

Figure 3:
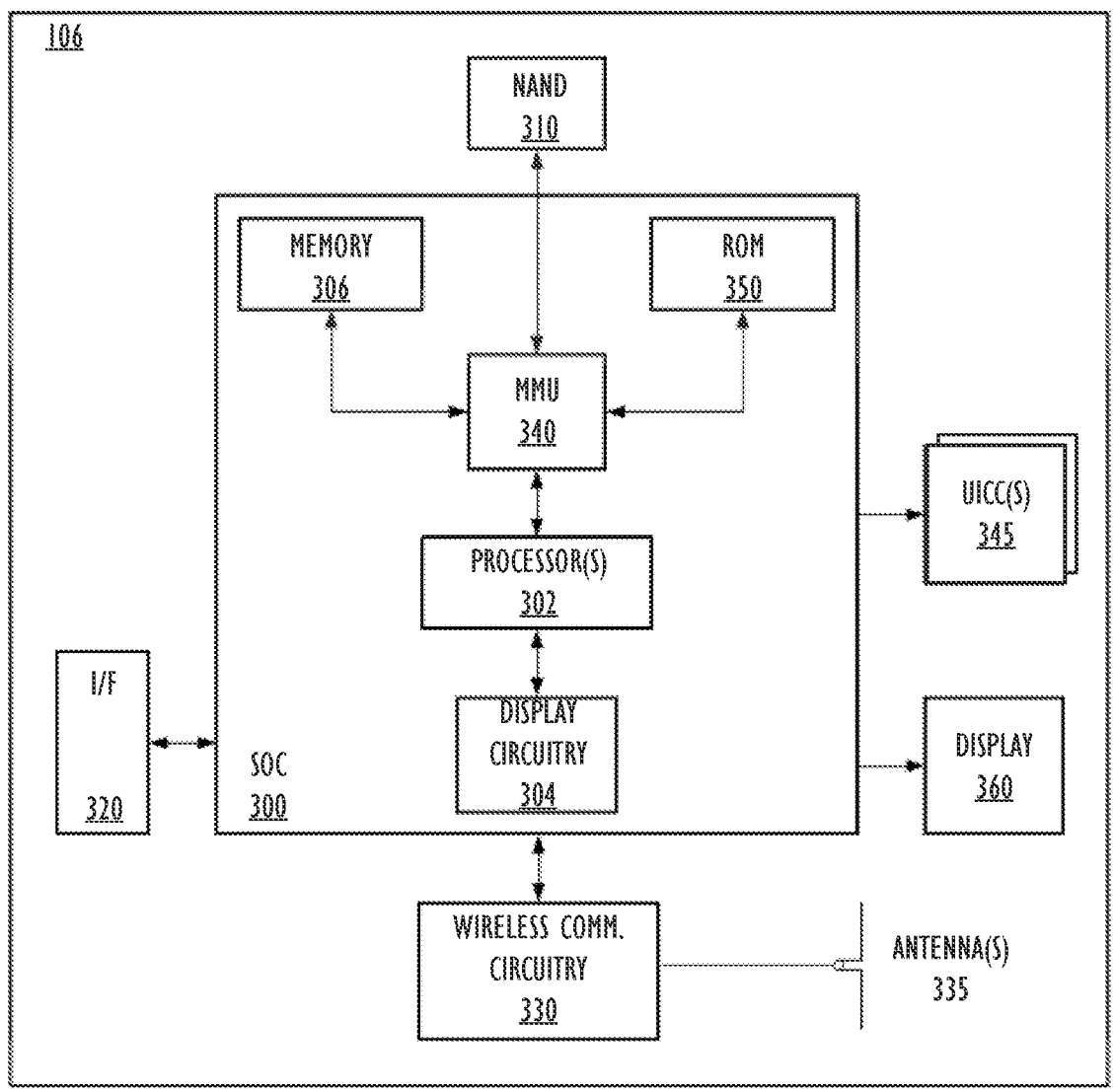
FIG. 3 illustrates an example block diagram of a UE, according to some Aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively, directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality (e.g., SIM card), such as one or more UICC(s) (Universal Integrated Circuit Card(s)) cards, one or more universal subscriber identity module (USIM), and/or one or more embedded SIM (eSIM). In some cases, the SIM cards may be a separate card which may be placed within the communication device 106, or built in (e.g., embedded) to the communication device 106. The communication device 106 may be configured with any combination of one or more eSIMs and/or separate SIM cards. In this example, the communication device includes two smart cards 345. The smart cards 345 include an international mobile subscriber identity (IMSI) number and associated security key. The IMSI number may be used to identify and authenticate the communication device 106 with a wireless network. In cases where the communication device 106 includes multiple smart cards 345, the communication device 106 may be able to establish separate connections to wireless networks with each smart card 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
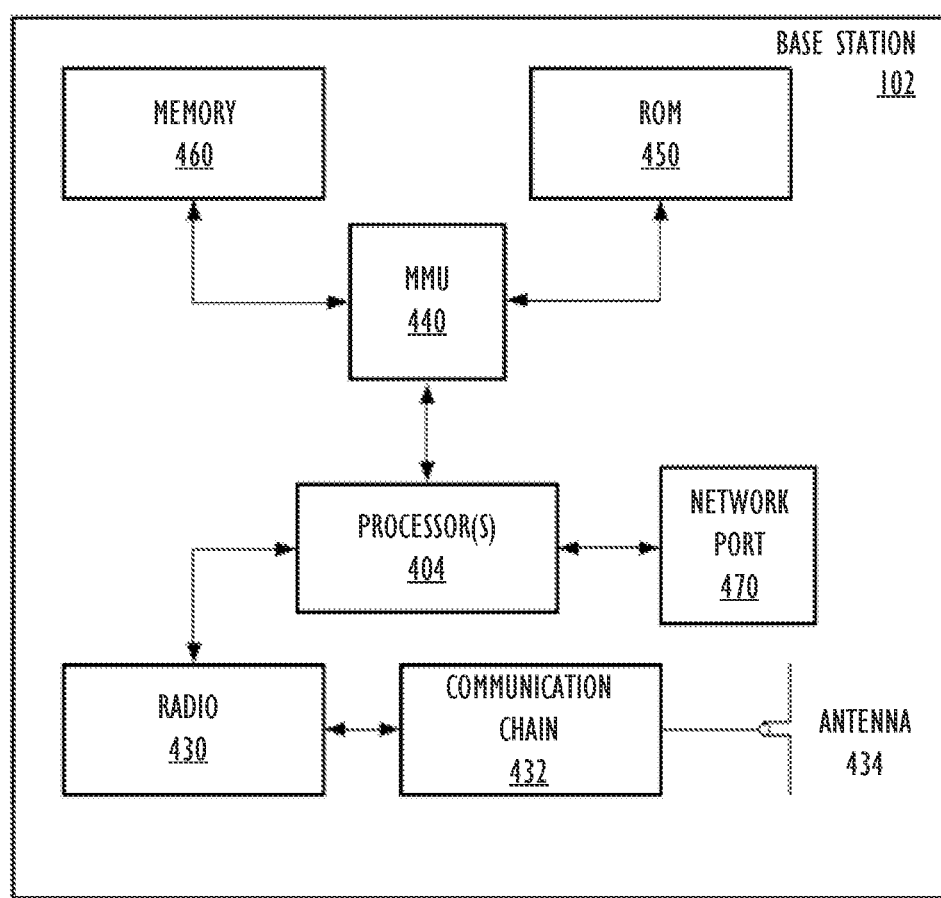
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
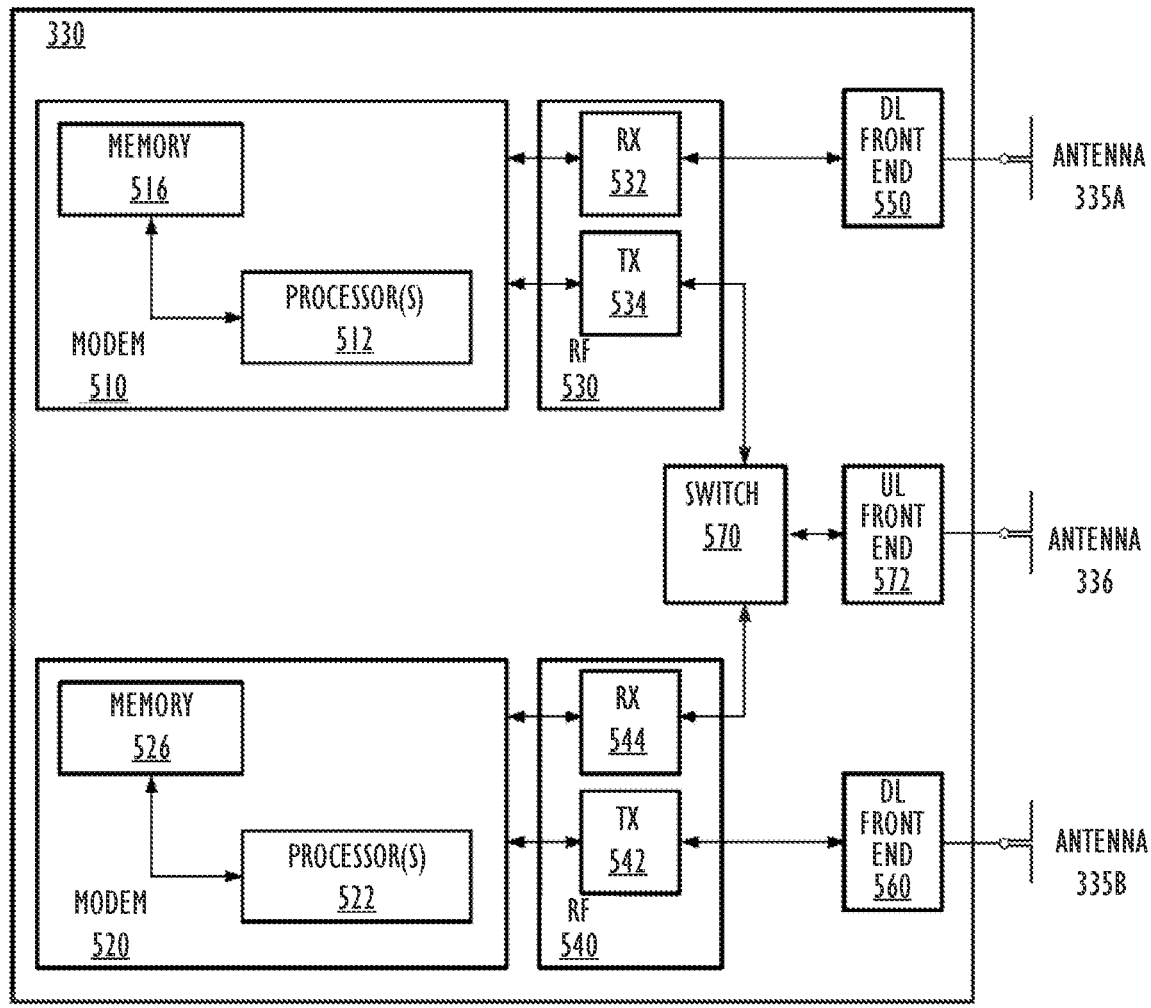
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Example Network Element

Figure 6:
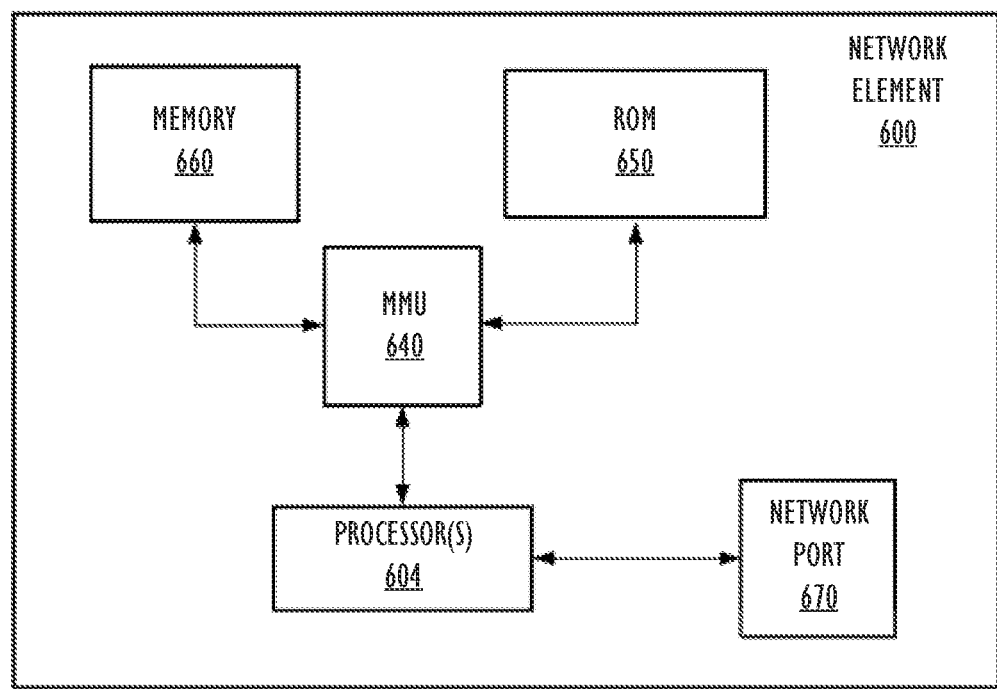
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

5G NR Architecture with LTE

Figure 7A:
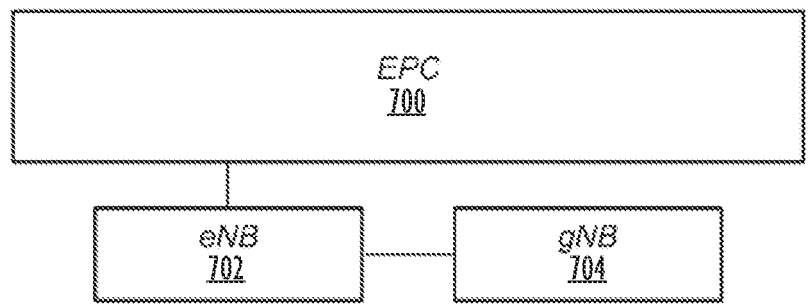
FIG. 7A illustrates an example of connections between an evolved packet core (EPC) network, an LTE base station (NB), and a 5G NR base station (gNB), according to some aspects.
Figure 7B:
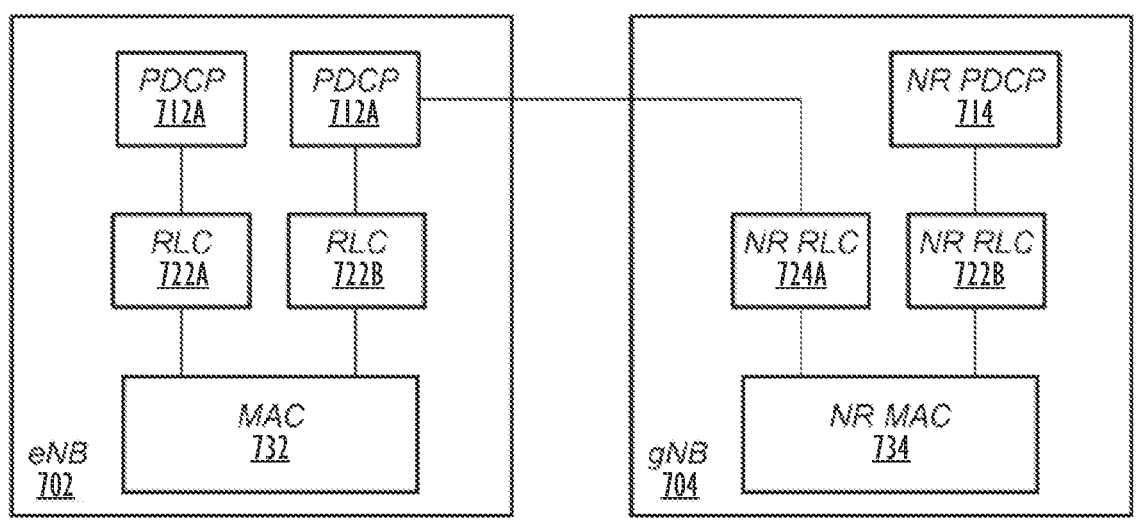
FIG. 7B illustrates an example of a protocol stack for an eNB and a gNB, according to some aspects.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 7A-B, evolved packet core (EPC) network 700 may continue to communicate with current LTE base stations (e.g., eNB 702). In addition, eNB 702 may be in communication with a 5G NR base station (e.g., base station 704) and may pass data between the EPC network 700 and base station 704. Thus, EPC network 700 may be used (or reused) and base station 704 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 7B illustrates a proposed protocol stack for eNB 702 and base station 704. As shown, eNB 702 may include a medium access control (MAC) layer 732 that interfaces with radio link control (RLC) layers 722A-b. RLC layer 722A may also interface with packet data convergence protocol (PDCP) layer 712 a and RLC layer 722B may interface with PDCP layer 712B. Similar to dual connectivity as specified in LTE-Advanced Release 12, PDCP layer 712A may interface via a master cell group (MCG) bearer to EPC network 700 whereas PDCP layer 712B may interface via a split bearer with EPC network 700.

Additionally, as shown, base station 704 may include a MAC layer 734 that interfaces with RLC layers 724A-b. RLC layer 724A may interface with PDCP layer 712B of eNB 702 via an X2 interface for information exchange and/or coordination (e.g., scheduling of a UE) between eNB 702 and base station 704. In addition, RLC layer 724B may interface with PDCP layer 714. Similar to dual connectivity as specified in LTE-Advanced Release 12, PDCP layer 714 may interface with EPC network 700 via a secondary cell group (SCG) bearer. Thus, eNB 702 may be considered a master node (MeNB) while base station 704 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 8:
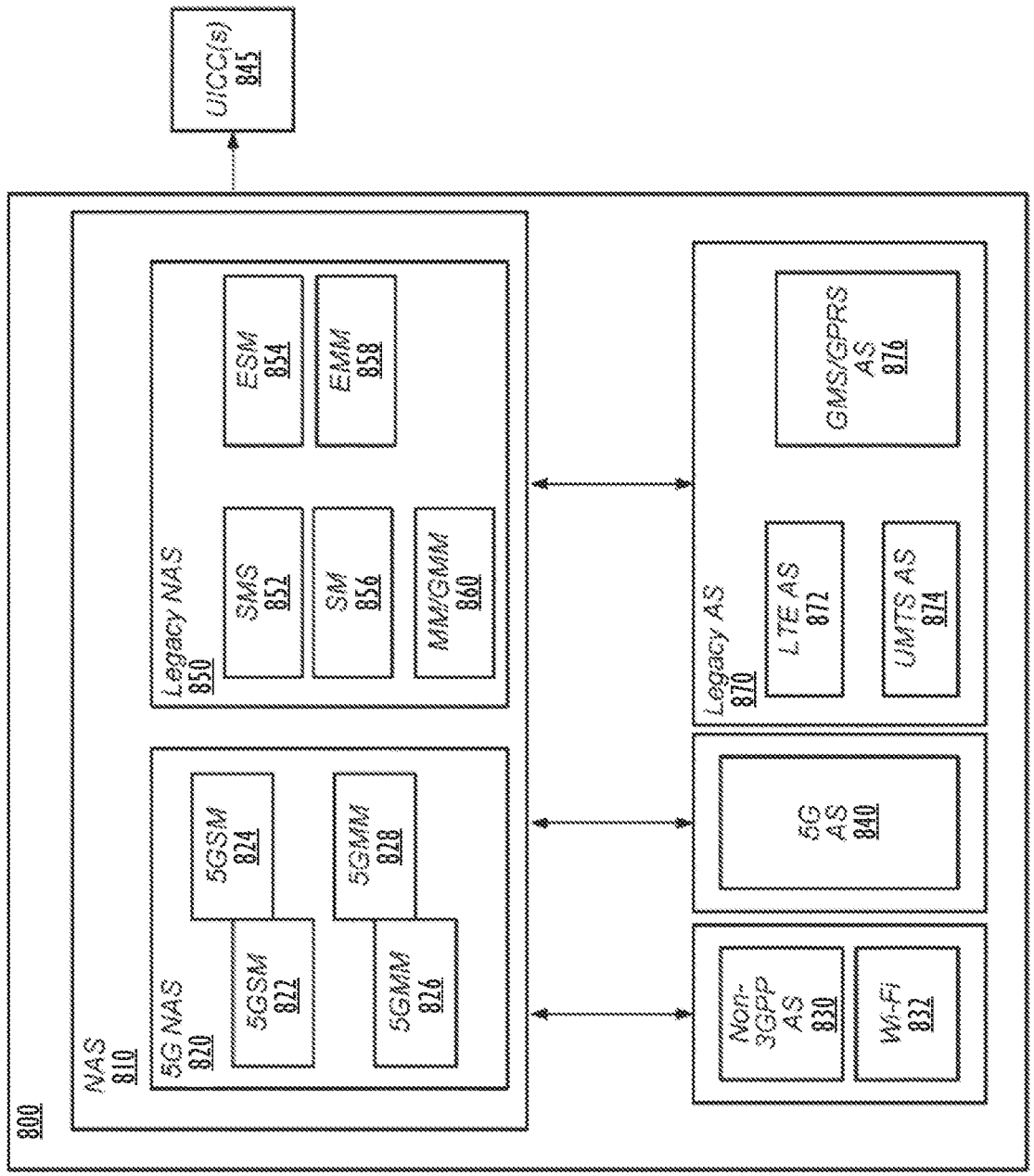
FIG. 8 illustrates an example of a baseband processor architecture for a UE, according to some aspects.

FIG. 8 illustrates an example of a baseband processor architecture for a UE (e.g., such as UE 106), according to some aspects. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described elements may be configured to perform methods to implement mechanisms for a multi-SIM capability signaling framework, e.g., as further described herein.

Wireless Device Attach/Registration

A communication device (e.g., wireless device or UE) may connect to one or more wireless elements through an attachment or registration process. For example, a wireless device connecting using an LTE communication standard may perform an attach procedure to connect to an eNB. Similarly, a wireless device connecting via a NR or 5G communication standard may perform a registration procedure to connect to a gNB. The attach/registration procedure of LTE and 5G NR are broadly similar. The wireless device may perform the registration/attach procedure when the wireless device initially attempts to connect to the wireless network, such as after being powered on, or when the appropriate radio is switched on, such as when airplane more is turned off. Initially, the wireless device may sense the physical medium for basic configuration and synchronization information related to the wireless node, such a time/frequency resources, root sequences, cyclic shifts, etc., which may be broadcast by the wireless network. The wireless device may then transmit an initial registration/attach request message to the wireless network, which may be referred to a msg1. Reception of msg1 by the wireless node may start a sequence of message exchanges between the wireless device and wireless node to connect the wireless device to the wireless network. This sequence of messages help set up aspects of the connection, such as RRC connection, physical layer channels, encoding and decoding information, assign resources, etc. In some wireless networks, such as 5G NR networks, the registration request process may be performed, during initial registration of the UE with the network, for a mobility registration update, or as part of a periodic registration update.

In some cases, a wireless connection between a wireless device and a wireless system may include multiple protocol layers. These layers may include an access stratus (AS) layer and a non-access stratum (NAS) layer. The AS layer controls the connection as between the wireless device and the wireless node. The AS layer includes radio link control (RLC), radio resource control (RRC) messaging, media access control (MAC), etc. The NAS layer may be used to for communications as between the wireless device and core network, such as the MME, S-GW, AMF, etc.

Multi-SIM (MUSIM) Operation

Subscriber identity module (SIM) cards are integrated circuits, which store data used to identify and authenticate a user on some wireless networks. A SIM card may be a separate card that is placed into a wireless device, or the SIM card may be built into the wireless device (e.g., an embedded SIM card). Many wireless devices have an ability to utilize multiple SIM cards. Having multiple SIM cards allows a wireless device to potentially maintain concurrent multiple wireless connections to multiple wireless networks. For example, a wireless device with two SIM cards may be able to connect to two different wireless carriers substantially concurrently. As another example, the wireless device with two SIM cards may be able to establish two separate connections to the same wireless carrier, each connection associated with a separate account, such as a work and personal account and phone number. For clarity, this disclosure will refer to operations with two SIMs (e.g., dual SIM), but the concepts discussed herein also apply to operations with additional (e.g., three or more) SIM cards.

There are many different implementations of multi-SIM (e.g., dual SIM) support on wireless devices. The most comprehensive implementation of dual-SIM may include separate transmit (TX) chains and receive (RX) chains for each SIM. Thus, such a dual SIM wireless device would include two TX chains and two RX chains with a separate TX chain and corresponding RX chain for each SIM. Similarly, some cases, wireless devices may be configured in a dual receive configuration where each SIM would be configured with a separate RX chain and a TX chain may be shared by the SIM. Thus, the radio of the wireless device may include two RX chains and a single TX chain. A wireless device with two RX chains and a single TX chain may be able to receive two transmissions, such as from two separate wireless networks, concurrently and transmit to one wireless network at a time.

However, maintaining a multiple TX/RX chains is relatively costly in terms of the including the extra components and power draw of those components. Instead, a dual SIM wireless device may be configured with a single RX chain and a single TX chain for both SIMs. Such a device may be able to receive a transmission from one wireless network at a time and transmit to one wireless network associated with one SIM instance at a time. As there is one RX chain, the wireless device tunes away from a first wireless network, associated with a first SIM, to transmit and receive data from a second wireless network, associated with a second SIM. Dual SIM operations with a single TX/RX chain can be challenging as currently there is no mechanism to allow coordination between the wireless networks being accessed with each SIM. Thus, if the wireless device is monitoring paging occasions for both wireless networks, there is no mechanism to ensure that the paging occasions for one wireless network do not occur at the same time as the paging occasions for the other wireless network. If such a paging occasion as between wireless networks were to occur for the wireless device with a single TX/RX chain, the wireless device may not be able to monitor both wireless network paging occasions at the same time. What is needed is a framework for multi-SIM coordination.

Multi-SIM Indication Framework

In accordance with aspects of the present disclosure, a wireless device may indicate its multi-SIM capability as a part of wireless device capability exchange (e.g., UE capability exchange). Based on this indication, the wireless network can then determine that the wireless device is capable of multi-SIM operation and take some action to help accommodate the MUSIM characteristics of this wireless device. For example, the wireless network may be able to adjust a paging or discontinuous reception (DRX) schedule of the wireless device or perform other network side optimizations based on the indication. As an example of a network side optimization, the wireless network may be able to use a common context for the wireless device in the case that both SIM cards are being used on the same wireless network and/or reallocate radio or network resources to help avoid interference.

Figures 9, 10:
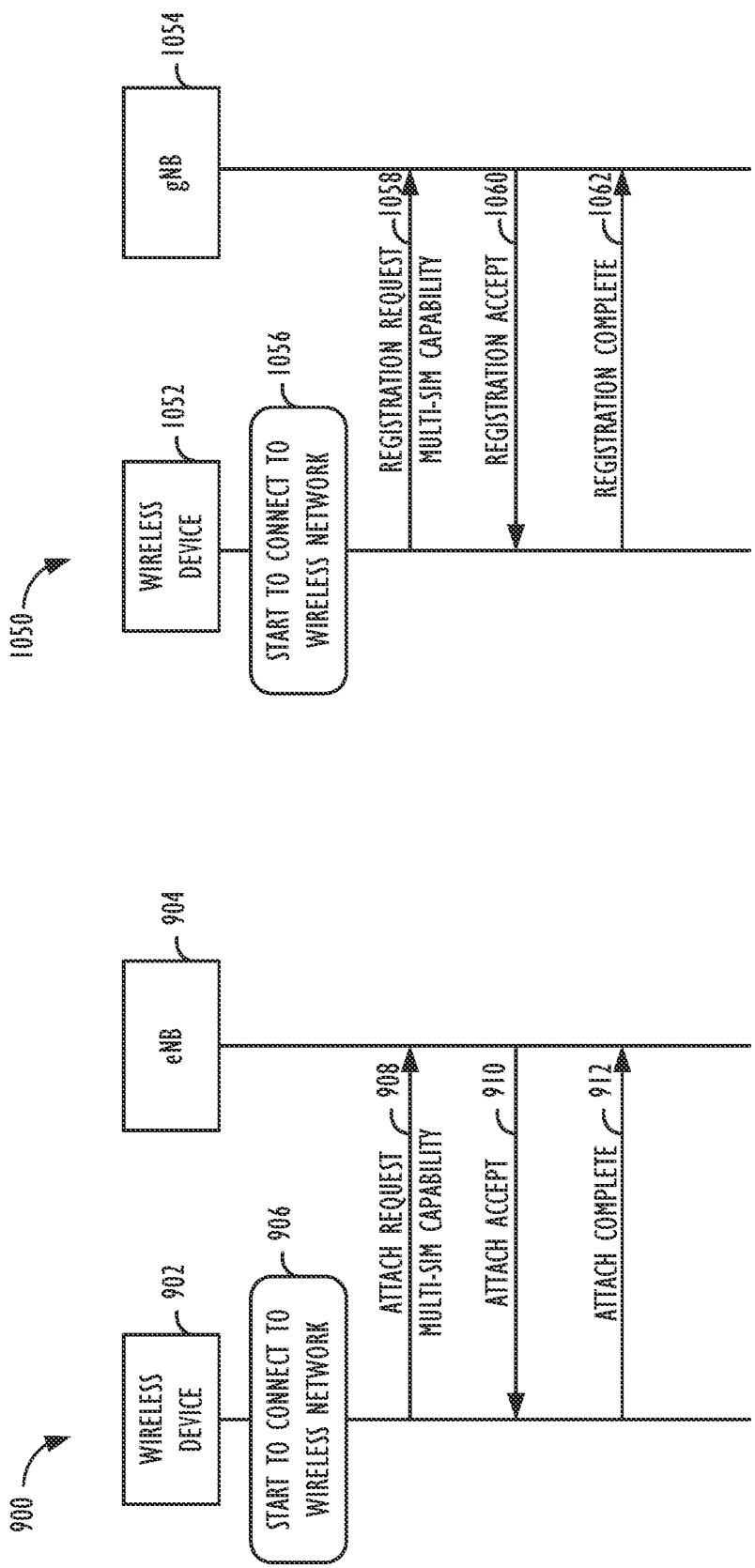
FIG. 9 is a message sequence diagram illustrating multi-SIM indications, in accordance with aspects of the present disclosure.
FIG. 10 is a message sequence diagram illustrating multi-SIM indications, in accordance with aspects of the present disclosure.

FIGS. 9-10 are message sequence diagrams illustrating multi-SIM indications, in accordance with aspects of the present disclosure. An attach procedure for LTE is illustrated in message sequence chart 900 showing messages between a wireless device 902 and an LTE eNB 904. One or more wireless nodes may transmit and/or receive the messages shown and processing of the messages may be performed by one or more network components such as those described with respect to FIGS. 7A and 7B. A radio of the wireless device is powered on and begins to attempt to connect 906 to the wireless network. For example, the wireless device may be powered on, airplane mode may be turned off a wireless radio powered on or when the current SIM configuration is modified, such as when a new physical SIM card is inserted, an eSIM profile enabled, when an existing physical SIM card is removed, an eSIM profile disabled, etc. In some cases, the wireless device may sense the physical medium for basic configuration and/or synchronization information for an LTE based wireless network. For example, in LTE, the wireless device may tune to certain radio frequencies, search for a master information block (MIB) and system information blocks (SIBs), decode the received blocks, generate a msg1 based on the received blocks, and transmit the msg1 to a wireless node to begin an initial attach procedure with the wireless network to establish an RRC connection.

Once the RRC connection is established, the wireless device may transmit an RRC connection setup complete message along with an attach request 908 to the wireless network. This attach request 908 may also include wireless device (UE) radio access capability information. The UE radio access capability information may be extended to include an indication of the multiple-SIM capabilities of the wireless device (e.g., maintaining connections to wireless networks using more than one SIM cards). The eNB 904 may respond to the attach request 908 with an attach accept message 910 and the wireless device 902 may respond to the attach accept message 910 with an attach complete message 912. Of note, there may be multiple messages exchanged as between the wireless device 902 and the eNB 904 between the attach request 908 and attach accept message 910, as well as the attach accept message 910 and the attach complete message 912 that may have been omitted in this discussion for clarity.

A registration procedure for 5G NR is illustrated in message sequence chart 1050 of FIG. 10, showing messages between a wireless device 1052 and an NR gNB 1054. As with LTE, one or more wireless nodes may transmit and/or receive the messages shown and processing of the messages may be performed by one or more network components such as those described with respect to FIG. 7A and. In NR, a radio of the wireless device is powered on and begins to attempt to connect 1056 to the wireless network. For example, the wireless device may be powered on, airplane mode may be turned off, a wireless radio powered on, when the current SIM configuration is modified, such as when a new physical SIM card is inserted, an eSIM profile enabled, when an existing physical SIM card is removed, an eSIM profile disabled, etc. In some cases, the wireless device may sense the physical medium for basic configuration and/or synchronization information for an 5G NR based wireless network. For example, in 5G NR, the wireless device may tune to certain radio frequencies, pick a random access preamble, and transmit the random access preamble to a wireless node to begin an initial connection procedure with the wireless network to establish an RRC connection.

Similar to LTE, once the RRC connection is established, the wireless device may transmit an RRC connection setup complete message along with a registration request 1058 to the wireless network. This registration request 1058 may also include wireless device (UE) capability information, such as 5G mobility management (5GMM) information, as well as UE security capability information. This UE capability information may also be extended to include an indication of the multi-SIM capabilities of the wireless device. The gNB 1054 may respond to the registration request 1058 with a registration accept message 1060 and the wireless device 1062 may respond to the registration accept message 1060 with a registration complete message 1062. Of note, there may also be multiple messages exchanged as between the wireless device 1062 and the eNB 1054 between the registration request 1058 and registration accept message 1060, as well as the registration accept message 1060 and registration complete message 1062 that may have been omitted in this discussion for clarity.

As discussed above, in some cases, multi-SIM capability information may be conveyed from the wireless device to the wireless network as a part of the attach/registration procedure at a NAS level. In such cases, the multi-SIM capability information is transmitted without being requested by the wireless network. In some cases, the multi-SIM capability information may be transmitted on demand. For example, instead of transmitting the multi-SIM capability information each time a wireless device connects to a wireless network, it may be preferable to transmit the multi-SIM capability information if the wireless network is capable of using such data. In such cases, the wireless network may request the multi-SIM capability information of a wireless device using a UE capability enquiry message.

The UE capability enquiry message allows a wireless network to query a wireless device regarding the wireless device's capabilities and may be sent, for example, as after establishing a connection with the wireless device, when roaming across registration/tracking areas, during periodic updates, during other instances as defined by, for example, the wireless network operator, etc. The enquiry may query the wireless device regarding specific features. This enquiry may be expanded to include an indication to the wireless device inquiring about the multi-SIM capability of the wireless device.

Figure 11:
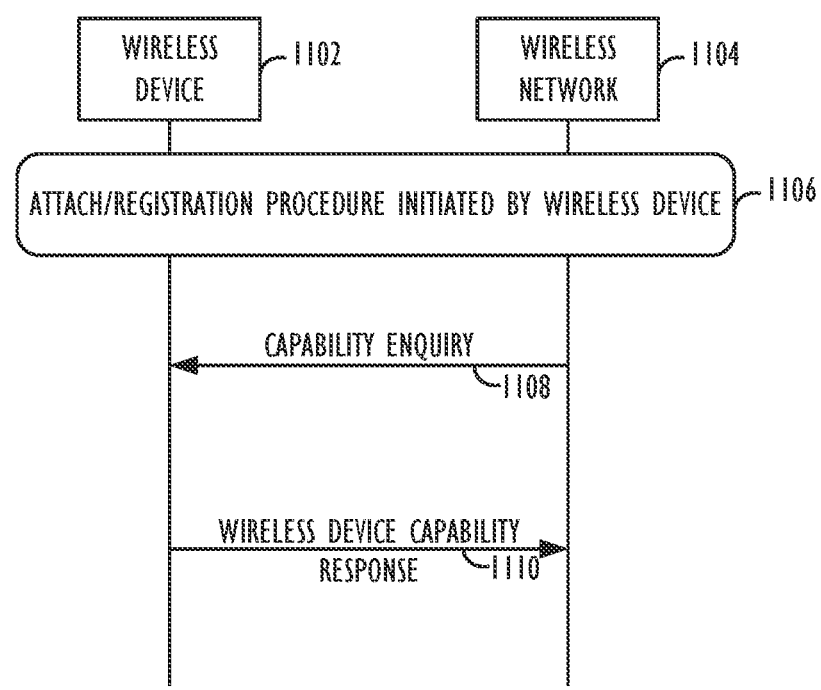
FIG. 11 is a message sequence diagram illustrating a multi-SIM indication, in accordance with aspects of the present disclosure.

FIG. 11 is a message sequence diagram 1100 illustrating a multi-SIM indication, in accordance with aspects of the present disclosure. As shown here, the wireless device 1102 may perform, with the wireless network 1104, an attach/registration procedure 1106. After the wireless device is attached/registered with a wireless network via an eNB/gNB, the wireless network may transmit, via AS messaging, wireless device capability inquiry 1108 to the wireless device 1102. The wireless device capability inquiry 1108 may include a request for whether the wireless device is multi-SIM capable. The wireless device may respond with a wireless device capability information response message 1110 including an indication of the wireless device's multi-SIM capabilities.

Multi-SIM Capability Information

In addition to indicating that the wireless device supports multi-SIM, the wireless device may include additional details regarding the multi-SIM capabilities of the wireless device. These additional details may be included with either the attach/registration request, or the wireless device capability information response. In some cases, the additional details may include whether the wireless device supports a single receive (SR) mode or a dual receive (DR) mode. The SR mode may correspond to the wireless device having a single RX chain, while the DR receive mode may correspond to the wireless device having two RX chains.

Additionally, the wireless device may indicate whether the wireless device supports dynamically switching between SR and DR mode. Dynamic SR/DR mode switching, for example, may help a wireless deal with interference issues, such as that may occur for overlapping frequency ranges. As a more detailed example, certain NR and LTE frequency bands overlap, such an LTE band 1 and NR band 1. If a wireless device is configured with such overlapping bands and is positioned such that the wireless device has a very strong signal on, for example LTE band 1, but has a substantially weaker signal on NR band 1, the wireless device may drop DR mode operation to SR mode due to interference between the LTE and NR signals, and resume DR mode operation when the interference is reduced. Similarly, in some cases, the wireless device may also indicate whether the wireless device supports a single transmit mode, a dual transmit mode, or whether the wireless device supports dynamically switching between single and dual transmit modes.

The additional information may also include an indication of the wireless device's concurrent connection limitations. In some cases, the wireless device may be limited in the types of wireless networks the wireless device can connect to concurrently. For example, the wireless device may be able to connect to LTE only on both SIM cards, then the wireless device may indicate that the wireless device supports LTE/LTE. Similarly, the wireless device may indicate that the wireless device supports one 5G NR connection on one SIM and LTE on the other, 5G NR on both SIMs, or LTE/NR on either or both SIMs. Such information may be used by the wireless network to help optimize the radio resource assignments and scheduling, for example, to avoid certain bands. As an example, if a first wireless network knows that a wireless device connected to the first wireless network over LTE supports LTE/NR and that NR deployments near where the wireless device is located use a particular frequency band which overlaps portions of the LTE frequency band, the first wireless network may move the wireless device to avoid the particular frequency band.

In some cases, the additional information may also include an indication of a data preference as between the SIM cards. For example, a wireless device may include two SIM cards associated with two different accounts where the price of data on a first SIM is less than the price of data on a second SIM. In this example, the wireless device may indicate a data preference for the first SIM. Such information may help a wireless network adjust the connection to the wireless device. For example, if the wireless network knows that it is not preferred for data, then the wireless network may be able to adjust radio resource assignments and scheduling to help optimize the wireless device for non-data related paging, such as phone calls, text messaging, etc.

In some cases, the additional information may also include an indication whether the other SIM is an intra-public land mobile network (PLMN) or inter-PLMN. For example, where the two SIMs are from different wireless network providers, the additional information may include an indication that the dual-SIM configuration is inter-PLMN. By indicating that the other SIM is inter-PLMN without indicating the specific other provider, a measure of user privacy may be maintained. An indication that the other SIM is intra-PLMN may be helpful for the wireless network as it may allow the wireless network to adjust radio resource assignments and scheduling to help optimize the wireless device, for example, to reduce battery consumption by adjusting paging schedules to maximize sleep times.

Multi-SIM Wireless Device Assistance Information

In multi-SIM operations, certain issues may arise which are not visible to the wireless network. For example, if the wireless device is unable to concurrently receive information from each wireless network the wireless device is connected to, the wireless device may tune-away from a first wireless network in order to receive data on a second wireless network. Generally, this tune-away is performed by the wireless device without notifying either wireless network explicitly through signaling messages. This tune-away can be problematic if the wireless device is scheduled to monitor paging occasions on both wireless networks at the same time, where the paging occasions overlap either fully or in part in a frequency and/or time domain. Such a case may be referred to as a paging collision as between the wireless networks. As another example, as discussed above, the wireless device may experience band conflict when the wireless device experiences interference as between frequency bands configured for a first SIM and frequency bands configured for a second SIM.

According to aspects of the present disclosure, a mechanism by which the wireless device can inform the wireless network about conditions related to multi-SIM operations and request changes to address such conditions may be provided. For example, a wireless device may detect a multi-SIM related issue, determine a solution for the multi-SIM related issue, and transmit a multi-SIM wireless device assistance information message to the wireless network. The multi-SIM wireless device assistance information message may include information intended to help resolve the detected multi-SIM related issue. As an example, the wireless device may include a request to reconfigure a paging occasion of the wireless device to help resolve a paging collision.

In some cases, the wireless device may include an indication of a paging collision along with a request to reconfigure the paging occasions of the wireless device in the multi-SIM wireless device assistance information message. The paging occasions may be based on an identifier, such as an assigned UE ID or 5G serving temporary mobile subscriber identity, and the wireless device may request a new assigned identifier, and thus reconfiguring the paging occasion. In some cases, the wireless device may request a dynamic offset to the paging occasion to adjust a length of the paging occasion. In some cases, the wireless device may request that the wireless network repeat a page over multiple consecutive paging occasions in a pre-determined manner. By repeating the paging, the wireless device has another chance to receive the page even if there is a paging collision the first time the page is sent. In the intra-PLMN scenario, paging collisions may be resolved by requesting unified paging for the two SIMs by combining the paging and using a single SIM for paging messages. In other cases, for the intra-PLMN scenario, the wireless device may request that both connections to the wireless network utilize the same identifier so that the paging occasions for both SIMs occur at the same time, but address the incoming paging message to a particular SIM instance during such a paging occasion.

In some cases, the wireless device may include an indication that the wireless device is experiencing band conflict as between multiple wireless networks in the multi-SIM wireless device assistance information message. The wireless network may then, in response, attempt to resolve the band conflict, for example, by redirecting the wireless device to a different cell, performing a handover, adjusting a frequency band of the wireless device, etc. In some cases, the wireless device may include, for example, a suggested band or handover target to the wireless network in the multi-SIM wireless device assistance information message.

In some cases, the multi-SIM wireless device assistance information message may include a request for a preferred RRC state change for the wireless device. For example, if the wireless device needs to tune away from a first wireless network in order to perform operations on a second wireless network, the first wireless network may request an RRC state change into an RRC inactive or RRC idle state. In some cases, the RRC inactive state would preserve context information with the wireless network and may provide for a faster transition back to the RRC connected state.

The multi-SIM wireless device assistance information message may also be used by the wireless device to help optimize multi-SIM operations. For example, the wireless device may attempt to reconfigure the paging occasions of the wireless networks to align paging occasions one after the other, as between the wireless networks, to attempt to maximize an amount of time the wireless device may be able to enter a sleep or lower power state.

Figure 12:
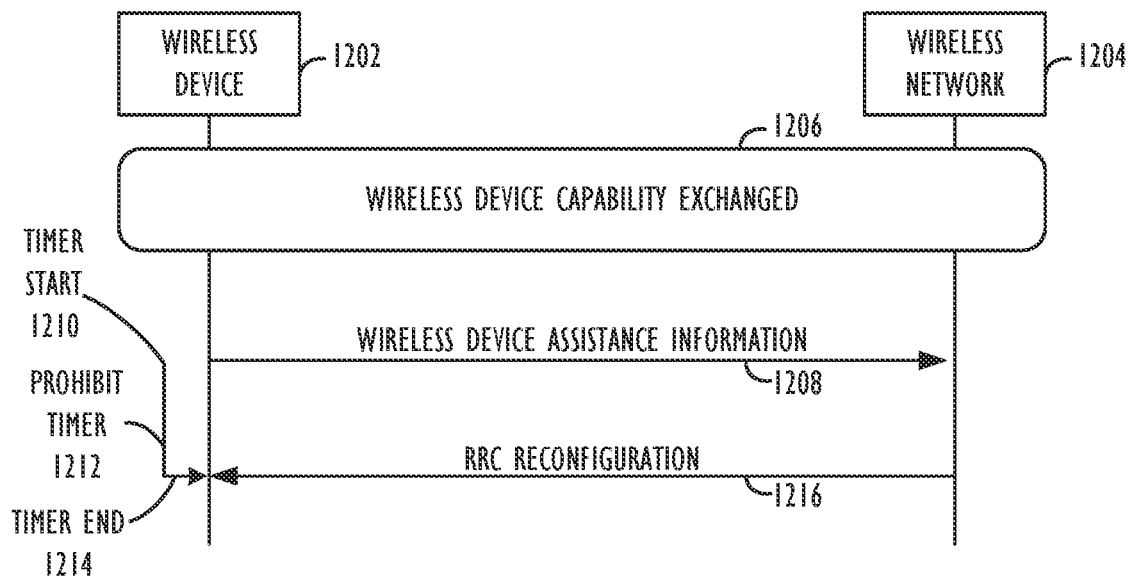
FIG. 12 is a message sequence diagram illustrating multi-SIM wireless device assistance information, in accordance with aspects of the present disclosure.

FIG. 12 is a message sequence diagram 1200 illustrating multi-SIM wireless device assistance information, in accordance with aspects of the present disclosure. Multi-SIM wireless device assistance information may be a signaling framework that may be used to help resolve multi-SIM related issues that may arise, such as paging collisions or band conflicts, as well as help optimize multi-SIM scheduling configurations. The multi-SIM wireless device assistance information signaling may be performed at an RRC level to allow for flexibility. In some cases, similar signaling may be performed using MAC-CE or DCI signaling. In message sequence diagram 1200, a wireless device 1202 may be connected to a wireless network 1204 and in a connected mode. The wireless device 1202 previously performed a capability exchange 1206 with the wireless network 1104, for example during the attach/registration procedure, or a UE capability enquiry procedure. The wireless device 1202 may also be configured with radio resources, DRX monitoring occasions, etc., for example, when connecting to the wireless network 1204.

After determining that there is a multi-SIM related issue to be addressed, the wireless device 1202 may generate and transmit a multi-SIM wireless device assistance information message 1208 to the wireless network 1204. The wireless device may also start 1210 a prohibit timer 1212 (e.g., a MUSIM UE assistance information (MUSIM UAI) prohibit timer) when the wireless device transmits the multi-SIM wireless device assistance information message 1208. The prohibit timer 1212 may be a timer which may be used to limit a frequency of sending assistance information messages to the wireless network 1204 to help reduce the over the air signaling load on the wireless network. The prohibit timer 1212 may end 1214 either after a certain amount of time has passed, a maximum retry counter value is met, and/or, as in this example, if the wireless network sends an RRC reconfiguration message 1216 to the wireless device 1202. In some cases, the RRC reconfiguration message 1216 may reconfigure the wireless device 1202 based on the information received in the multi-SIM wireless device assistance information message 1208.

Figure 13:
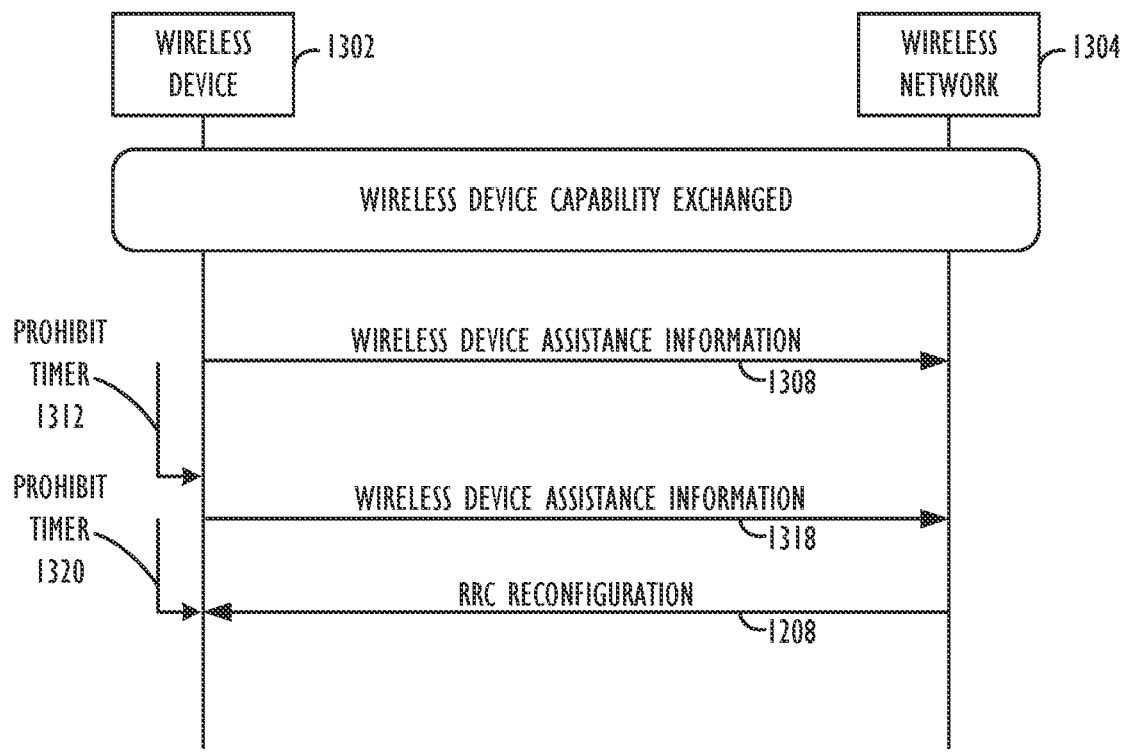
FIG. 13 is a message sequence diagram illustrating multi-SIM wireless device assistance information, in accordance with aspects of the present disclosure.

FIG. 13 is a message sequence diagram 1300 illustrating multi-SIM wireless device assistance information, in accordance with aspects of the present disclosure. In some cases, a wireless device 1302 may not receive a response, from a wireless network 1304 to a first multi-SIM wireless device assistance information message 1308. In some cases, the wireless network 1304 may not be obligated to respond to or reconfigure the wireless device. After a prohibit time 1312 expires, the wireless device 1302 may transmit a second multi-SIM wireless device assistance information message 1318 to the wireless network 1304. Each multi-SIM wireless device assistance information message may have a separate associated prohibit timer and thus, a second prohibit timer 1320 associated with the second multi-SIM wireless device assistance information message 1318 may be started when the second multi-SIM wireless device assistance information message 1318 was sent. In this example, an RRC reconfiguration message 1322 may be received and the second prohibit timer 1320 stopped. In some cases, there may be a retry counter that may be incremented with each multi-SIM wireless device assistance information message sent. Once the retry counter value meets a maximum retry counter value, the wireless device may stop sending multi-SIM wireless device assistance information messages for a duration. In some cases, the duration may be for the duration of the time that the wireless device is in a connected mode and the maximum retry counter may be reset, for example, if the wireless device enters an idle or inactive mode and then reenters the connected mode with the wireless network. In some cases, the maximum retry counter may be configured, for example by the network, and/or the wireless device may be preconfigured with a maximum retry counter.

Figure 14:
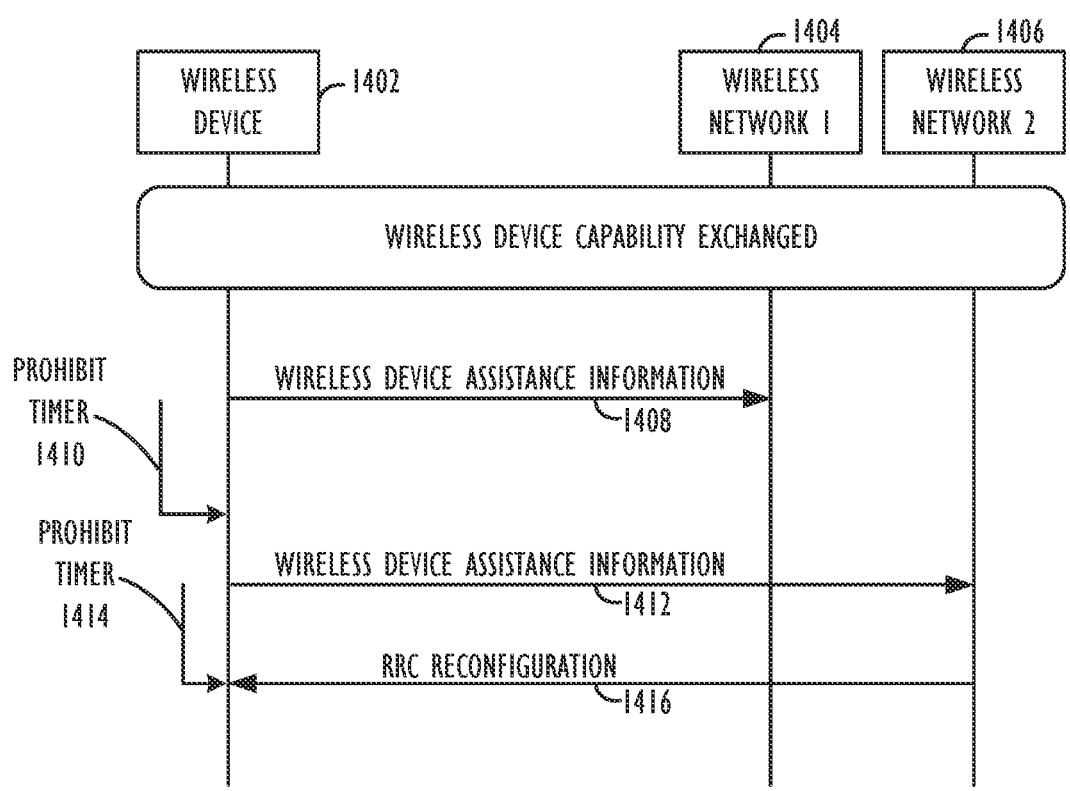
FIG. 14 is a message sequence diagram illustrating multi-SIM wireless device assistance information with multiple wireless networks, in accordance with aspects of the present disclosure.

FIG. 14 is a message sequence diagram 1400 illustrating multi-SIM wireless device assistance information with multiple wireless networks, in accordance with aspects of the present disclosure. In message sequence diagram 1400, a wireless device 1402 is connected to a first wireless network 1404 and a second wireless network 1406. In this example, the wireless device may first attempt to obtain a reconfiguration from the first wireless network, determine that the first wireless network has not responded, and then attempt to obtain a reconfiguration from the second wireless network. As indicated above, the first wireless network 1404 is not be obligated to respond to or reconfigure the wireless device in response to a first multi-SIM wireless device assistance information message 1408 from the wireless device 1402. To increase a likelihood that the wireless device 1402 can obtain a resolution to address the multi-SIM related issue, the wireless device 1402 may wait until a first prohibit timer 1410 associated with the first multi-SIM wireless device assistance information message 1408 expires without a response or reconfiguration message from the first wireless network 1404. The wireless device 1402 may then transmit a second multi-SIM wireless device assistance information message 1412 to the second wireless network 1406 and set a second prohibit timer 1414. The second wireless network may then send an RRC reconfiguration message based on the second multi-SIM wireless device assistance information message 1412. In some cases, sequentially trying to obtain a reconfiguration from a first network, determining that the network is not responding before trying the second wireless network may be most useful when attempting to reconfigure a particular parameter as between both wireless networks. For example, if the wireless device detects a paging collision issue, the wireless device should not try to send the same multi-SIM wireless device assistance information message attempting to move the paging occasions to another time to both wireless networks in parallel. Doing so may result in both wireless networks moving their respective paging occasions to the another time, resulting in another paging collision issue. Thus, if the wireless device is attempting to adjust a common parameter, such as paging occasion time, as between the two wireless networks, the wireless device may be better off sequentially sending multi-SIM wireless device assistance information message to the wireless networks one at a time.

In some cases, it may be possible to send multi-SIM wireless device assistance information message to multiple wireless networks in parallel. If the wireless device attempts to adjust different parameters for the wireless networks, there is less of a chance that the wireless networks will have conflicting reconfigurations. For example, if the wireless device detects a paging collision issue, the wireless device may attempt to request a dynamic offset to the configured paging occasion to repeat a page over multiple consecutive paging occasion with a first wireless network, while requesting a second wireless network to redefine the paging occasion for another time. In such a case, if either, or both, wireless networks reconfigures the wireless device as requested, there is a low likelihood of conflicting changes as between the wireless networks as changes to different parameters are being request in each multi-SIM wireless device assistance information message (e.g., increasing repetitions of a page and adjusting the paging occasion timing).

Figure 15:
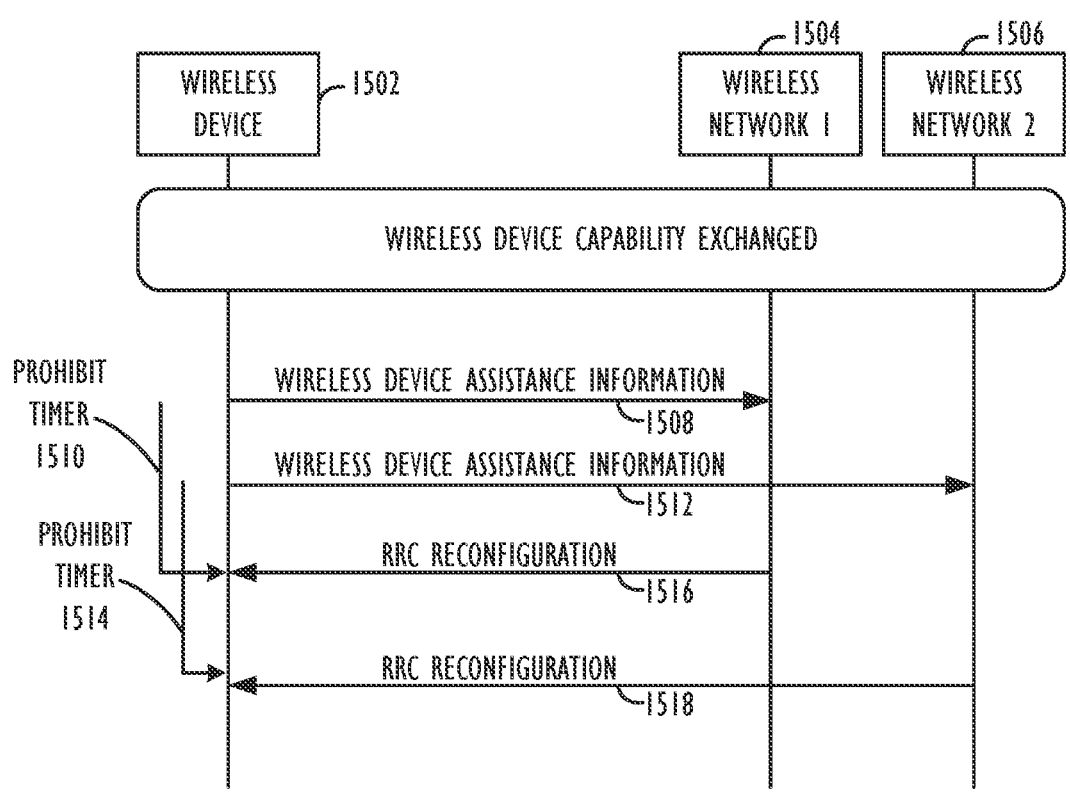
FIG. 15 is a message sequence diagram illustrating multi-SIM wireless device assistance information with multiple wireless networks, in accordance with aspects of the present disclosure.

FIG. 15 is a message sequence diagram 1500 illustrating multi-SIM wireless device assistance information with multiple wireless networks, in accordance with aspects of the present disclosure. In message sequence diagram 1500, a wireless device 1502 is connected to a first wireless network 1504 and a second wireless network 1506. In this example, the wireless device may concurrently attempt to obtain reconfiguration from both wireless networks. The wireless device 1502 may transmit a first multi-SIM wireless device assistance information message 1508 to the first wireless network 1504 and start an associated first prohibit time 1510. The wireless device 1502 may also, prior to the expiration of the first prohibit timer 1510, transmit a second multi-SIM wireless device assistance information message 1512 to the second wireless network 1506 and starting an associated second prohibit timer 1514. In some cases, the reconfiguration being requested in the two multi-SIM wireless device assistance information messages are non-conflicting changes. In this example, the wireless device 1502 may then receive a first RRC reconfiguration message 1516, based on the first multi-SIM wireless device assistance information message 1508, from the first wireless network 1504 as well as a second RRC reconfiguration message 1518, based on the second multi-SIM wireless device assistance information message 1512, from the second wireless network 1506. On receiving the respective RRC reconfiguration messages, the corresponding prohibit timers are stopped. The wireless device may then implement the reconfigurations.

In some cases, multi-SIM wireless device assistance information message may be used to request a delta configuration change over a previously requested configuration. For example, certain requested configurations in a multi-SIM wireless device assistance information message may imply that a previously requested configuration is still valid. As a more detailed example, the wireless device may transmit, to a first wireless network, a first multi-SIM wireless device assistance information message including a request to reconfigure the paging occasion based on an offset. The first wireless network may respond with an RRC reconfiguration message reconfiguring the paging occasion based on the offset as requested by the wireless device. The wireless device may then transmit a second multi-SIM wireless device assistance information message requesting to go into an RRC inactive mode so the wireless device may tune away from the first wireless network and perform operations on a second wireless network. The wireless device may then tune back to the first wireless network and transmit a third multi-SIM wireless device assistance information message to the first wireless network requesting to go back into an RRC active mode without any other reconfiguration requests. As there are no other reconfiguration requests, the first wireless network may interpret the third multi-SIM wireless device assistance information message as implying the previous configuration was acceptable to the wireless device and the request to go into the RRC inactive mode and back into the RRC active mode was a one-off or temporary change. The first wireless network may then send an RRC reconfiguration message back to the wireless device switching the wireless device back into the RRC active mode with the previous configuration with the paging occasion based on the previously requested offset. In some cases, the multi-SIM wireless device assistance information message may indicate that a requested change is a delta signal change.

Figure 16:
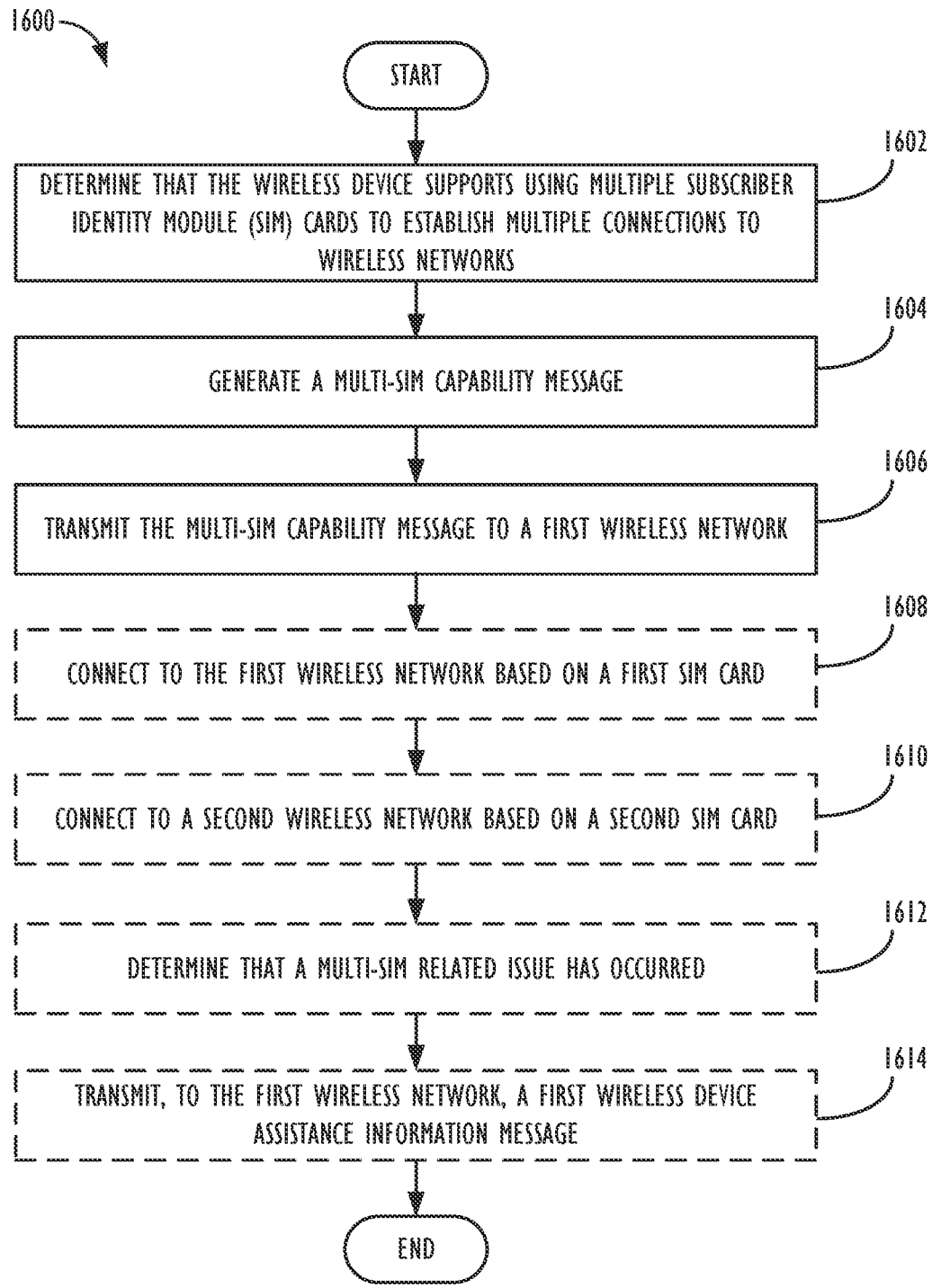
FIG. 16 is a flowchart illustrating a technique for multi-SIM indications, in accordance with aspects of the present disclosure.

FIG. 16 is a flowchart 1600 illustrating a technique for multi-SIM indications, in accordance with aspects of the present disclosure. At block 1602, a wireless device determines that the wireless device supports using multiple subscriber identity module (SIM) cards to establish multiple connects to wireless networks. For example, the wireless device may be configured to support multiple SIM cards. The SIM cards may be a separate card that may be placed in the wireless device, or an embedded SIM card. At block 1604, the wireless device generates a multi-SIM capability message. In some cases, this multi-SIM capability message may indicate one or more types of wireless networks supported for each SIM card. In some cases, the multi-SIM capability message includes an indication that the wireless device can connect to multiple different wireless networks. In some cases, generating the multi-SIM capability message includes determining whether the wireless device can receive a first transmission associated with a first SIM card concurrently with a second transmission associated with a second SIM card and generating an indication, for the multi-SIM capability message, whether the wireless device can receive the first transmission concurrently with the second transmission. For example, the wireless device may be connected to multiple wireless carriers concurrently and the wireless device may indicate such a capability to the wireless network. In some cases, the multi-SIM capability message includes an indication that the wireless device can connect a same wireless network multiple times. In some cases, the wireless device may indicate a receive mode supported by the wireless device. In some cases, the wireless device may indicate a data preference for one of the SIM cards.

At block 1606, the wireless device transmits the multi-SIM capability message to a wireless network. In some cases, the multi-SIM capability message is transmitted to a first wireless network in an attach request message. In some cases, the multi-SIM capability message is transmitted to a first wireless network in a registration request message. In some cases, the wireless device may receive a capability enquiry from a first wireless network, the capability enquiry including an indication inquiring about the multi-SIM capability of the wireless device. The wireless device may transmit the multi-SIM capability message in response to the capability enquiry from the first wireless network. In some cases, the wireless device may receive, from the wireless network, a connection configuration based on the multi-SIM capability message.

Optionally, at block 1608, the wireless device may connect to the first wireless network based on a first SIM card. Optionally, at block 1610, the wireless device may connect to a second wireless network based on a second SIM card. Optionally, at block 1612, the wireless device may determine that a multi-SIM related issue has occurred. Examples of multi-SIM related issues may include paging collisions, band collisions, possible multi-SIM operation optimizations, multi-SIM suspension/resumption, etc. In some cases, determining that a multi-SIM related issue has occurred comprises determining that a first paging occasion associated with the first wireless network overlaps a second paging occasion associated with the second wireless network. In some cases, determining that a multi-SIM related issue has occurred comprises determining that a first frequency band with the first wireless network overlaps with a second frequency band associated with the second wireless network.

Optionally, at block 1614, the wireless device may transmit, to the first wireless network, a first wireless device assistance information message, the first wireless device assistance information message based on the determined multi-SIM related issue. For example, the wireless device may detect a paging collision has occurred and determine a potential solution to the paging collision, such as moving one or more paging occasions. The wireless device may generate the first wireless device assistance information message including an indication of the multi-SIM related issue. In some cases, the first wireless device assistance information message may include the potential solution, for example, as a suggested reconfiguration.

In some cases, the wireless device may start a first prohibit timer associated with the first wireless device assistance information message. In some cases, the wireless device may also receive a radio resource control (RRC) reconfiguration message from the first wireless network, stop the first prohibit timer, and reconfigure the connection with the first wireless network based on the RRC reconfiguration message. In some cases, the wireless device may determine that the first prohibit timer has ended. For example, if no RRC reconfiguration message is received, the prohibit timer may expire when the timer ends. The wireless device may transmit, to the first wireless network, a second wireless device assistance information message. The wireless device may also repeat the steps of determining that the first prohibit timer has ended and transmitting the second wireless device assistance information message until a maximum retry number is reached. For example, the wireless device may transmit another wireless device assistance information message to the wireless network. This other wireless device assistance information message may be the same as the initial wireless device assistance message, or different from the initial wireless device assistance message. Additional wireless device assistance messages may be transmitted until a maximum number of retries is reached. In some cases, the wireless device may also determine that the first prohibit timer has ended, transmit, to the second wireless network, a third wireless device assistance information message, and start a second prohibit timer associated with the third wireless device assistance information message. The wireless device may also receive a radio resource control (RRC) reconfiguration message from the second wireless network, stop the second prohibit timer, and reconfigure the connection with the second wireless network based on the RRC reconfiguration message.

Figure 17:
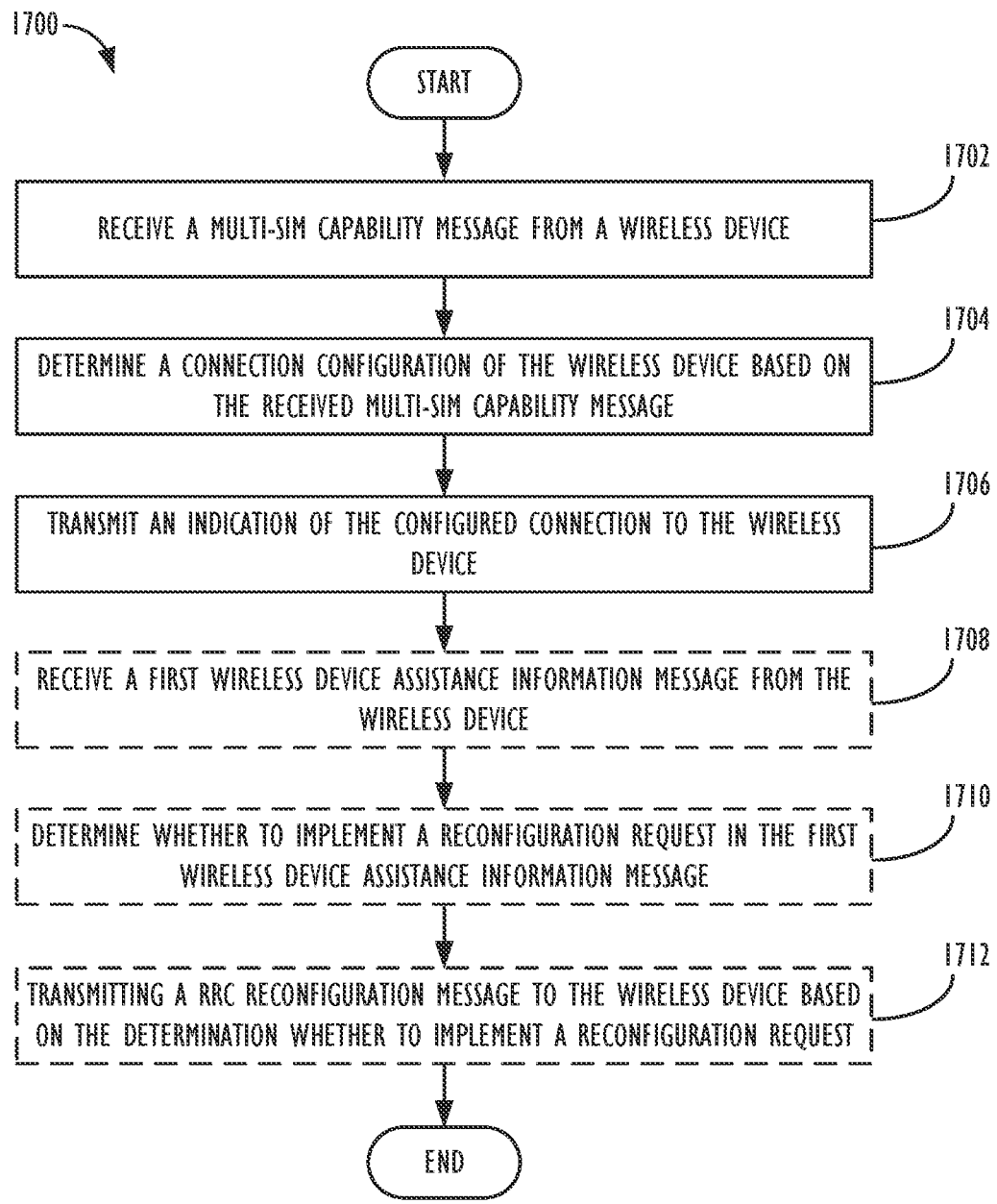
FIG. 17 is a flowchart illustrating a technique for multi-SIM indications, in accordance with aspects of the present disclosure.

FIG. 17 is a flowchart 1700 illustrating a technique for multi-SIM indications, in accordance with aspects of the present disclosure. At block 1702, the wireless system may receive a multi-SIM capability message from a wireless device. In some cases, the multi-SIM capability message is received by the wireless system in an attach request message. In other cases, the multi-SIM capability message is received by the wireless system in a registration request message. In some cases, the wireless system transmits, to the wireless device, a capability enquiry requesting multi-SIM capability information, and the receives, from the wireless device, a capability response message in response to the capability enquiry. In some cases, the multi-SIM capability message includes an indication that the wireless device can receive a first transmission associated with a first SIM card concurrently with a second transmission associated with a second SIM card. In some cases, the multi-SIM capability message includes an indication of a type of wireless networks that are supported for each SIM card. In some cases, the multi-SIM capability message includes an indication that the wireless device can connect to multiple different wireless networks.

At block 1704, the wireless system may determine a connection configuration of the wireless device based on the received multi-SIM capability message. For example, the wireless system may adjust radio resources to avoid potential band interference with other wireless networks, adjust paging occasions, determine that the wireless device is connected multiple times to the wireless system and adjust paging occasions based on this determination, or adjust another connection parameter based on the received multi-SIM capability message.

At block 1706, the wireless system transmits an indication of the configured connection to the wireless device. In some cases, the indication may be transmitted in an RRC reconfiguration message. Optionally, at block 1708, the wireless system may receive a first wireless device assistance information message from the wireless device. For example, the wireless device may detect a paging collision has occurred and determine a potential solution to the paging collision, such as moving one or more paging occasions. The wireless device may send the first wireless device assistance information message including an indication of the multi-SIM related issue. In some cases, the first wireless device assistance information message may include the potential solution, for example, as a suggested reconfiguration Optionally, at block 1708, the wireless system determines whether to implement a reconfiguration request in the first wireless device assistance information message. For example, the wireless system may evaluate the suggested reconfiguration and determine whether the suggested reconfiguration is possible based on the scheduling of the first wireless device and other devices which are connected to the wireless system.

Optionally, at block 1710, the wireless system transmits a radio resource control (RRC) reconfiguration message to the wireless device based on the determination whether to implement a reconfiguration request. For example, if the suggested reconfiguration is possible, the wireless system may send an RRC reconfiguration message to the wireless device reconfiguration the connection of the wireless device based on the suggested reconfiguration. In some cases, such as if the suggested reconfiguration is not possible, the system is too busy, etc., the wireless system may drop the first wireless device assistance information message and not respond to the wireless device.

EXAMPLES

In the following sections, further exemplary aspects are provided.

According to Example 1, a wireless device comprising: an antenna; a radio operably coupled to the antenna; and a processor operably coupled to the radio, wherein the wireless device is configured to: determine that the wireless device supports using multiple subscriber identity module (SIM) cards to establish multiple connections to wireless networks; generate a multi-SIM capability message; and transmit the multi-SIM capability message to a first wireless network.

Example 2 comprises the subject matter of example 1, wherein the multi-SIM capability message is transmitted to a first wireless network in an attach request message.

Example 3 comprises the subject matter of example 1, wherein the multi-SIM capability message is transmitted to the first wireless network in a registration request message.

Example 4 comprises the subject matter of example 1, wherein the multi-SIM capability message is transmitted to the first wireless network in a capability report to the first wireless network.

Example 5 comprises the subject matter of example 4, wherein the wireless device is further configured to receive, from the first wireless network, a capability enquiry, and wherein the capability report is transmitted in response to the capability enquiry.

Example 6 comprises the subject matter of example 1, wherein the wireless device is configured to generate the multi-SIM capability message by determining whether the wireless device can receive a first transmission associated with a first SIM card concurrently with a second transmission associated with a second SIM card, and wherein the multi-SIM capability message includes an indication whether the wireless device can receive the first transmission concurrently with the second transmission.

Example 7 comprises the subject matter of example 1, wherein the multi-SIM capability message includes an indication of one or more types of wireless networks that are supported for each SIM card.

Example 8 comprises the subject matter of example 1, wherein the multi-SIM capability message includes an indication that the wireless device can connect to multiple different wireless networks.

Example 9 comprises the subject matter of example 1, wherein the wireless device is further configured to: connect to the first wireless network based on a first SIM card; connect to a second wireless network based on a second SIM card; determine that a multi-SIM related issue has occurred; and transmit, to the first wireless network, a first wireless device assistance information message, the first wireless device assistance information message based on the determined multi-SIM related issue.

Example 10 comprises the subject matter of example 9, wherein the wireless device is further configured to start a first prohibit timer associated with the first wireless device assistance information message.

Example 11 comprises the subject matter of example 10, wherein the wireless device is further configured to: receive a radio resource control (RRC) reconfiguration message from the first wireless network; stop the first prohibit timer; and reconfigure the connection with the first wireless network based on the RRC reconfiguration message.

Example 12 comprises the subject matter of example 10, wherein the wireless device is further configured to: determine that the first prohibit timer has ended; and transmit, to the first wireless network, a second wireless device assistance information message.

Example 13 comprises the subject matter of example 12, wherein the wireless device is further configured to repeat the steps of determining that the first prohibit timer has ended and transmitting the second wireless device assistance information message until a maximum retry number is reached.

Example 14 comprises the subject matter of example 10, wherein the wireless device is further configured to: determine that the first prohibit timer has ended; transmit, to the second wireless network, a third wireless device assistance information message; and start a second prohibit timer associated with the third wireless device assistance information message.

Example 15 comprises the subject matter of example 14, wherein the wireless device is further configured to: receive a radio resource control (RRC) reconfiguration message from the second wireless network; stop the second prohibit timer; and reconfigure the connection with the second wireless network based on the RRC reconfiguration message.

Example 16 comprises the subject matter of example 9, wherein determining that a multi-SIM related issue has occurred comprises determining that a first paging occasion associated with the first wireless network overlaps a second paging occasion associated with the second wireless network.

Example 17 comprises the subject matter of example 9, wherein determining that a multi-SIM related issue has occurred comprises determining that a first frequency band with the first wireless network overlaps with a second frequency band associated with the second wireless network.

Example 18 comprises the subject matter of example 9, wherein the wireless device is further configured to: receive a first radio resource control (RRC) reconfiguration message from the first wireless network based on the first wireless device assistance information message; transmit, to the first wireless network, a second wireless device assistance information message, the second wireless device assistance information message including a delta configuration change; receive a second RRC reconfiguration message from the first wireless network based on the second wireless device assistance information message; transmit, to the first wireless network, a third wireless device assistance information message, the third wireless device assistance information message including an indication to stop the delta configuration change; and receive a third RRC reconfiguration message form the first wireless network based on the first wireless device assistance information message.

Example 19 comprises the subject matter of example 1, wherein the multi-SIM capability message includes an indication that the wireless device can connect a same wireless network multiple times.

According to Example 20, a wireless system comprising: an antenna; a radio operably coupled to the antenna; and a processor operably coupled to the radio, wherein the wireless system is configured to: receive a multi-SIM capability message from a wireless device; determine a connection configuration of the wireless device based on the received multi-SIM capability message; and transmit an indication of the configured connection to the wireless device.

Example 21 comprises the subject matter of example 20, wherein the multi-SIM capability message is received by the wireless system in an attach request message.

Example 22 comprises the subject matter of example 20, wherein the multi-SIM capability message is received by the wireless system in a registration request message.

Example 23 comprises the subject matter of example 20, wherein the multi-SIM capability message is received by the wireless system in a capability report.

Example 24 comprises the subject matter of example 23, wherein the wireless system is further configured to: transmit, to the wireless device, a capability enquiry requesting multi-SIM capability information; and wherein the capability report is received in response to the capability enquiry.

Example 25 comprises the subject matter of example 20, wherein the multi-SIM capability message includes an indication that the wireless device can receive a first transmission associated with a first SIM card concurrently with a second transmission associated with a second SIM card.

Example 26 comprises the subject matter of example 20, wherein the multi-SIM capability message includes an indication of a type of wireless networks that are supported for each SIM card.

Example 27 comprises the subject matter of example 20, wherein the multi-SIM capability message includes an indication that the wireless device can connect to multiple different wireless networks.

Example 28 comprises the subject matter of example 20, wherein the wireless system is further configured to receive a first wireless device assistance information message from the wireless device.

Example 29 comprises the subject matter of example 28, wherein the wireless system is further configured to: determine whether to implement a reconfiguration request in the first wireless device assistance information message; and transmit a radio resource control (RRC) reconfiguration message to the wireless device based on the determination whether to implement a reconfiguration request.

Example 30 comprises the subject matter of example 29, wherein the wireless system is further configured to: receive, from the wireless device, a second wireless device assistance information message, the second wireless device assistance information message including a delta configuration change; transmit a second RRC reconfiguration message to the wireless device based on the second wireless device assistance information message; receive, from the wireless device, a third wireless device assistance information message, the third wireless device assistance information message including an indication to stop the delta configuration change; and transmit a third RRC reconfiguration message to the wireless device based on the first wireless device assistance information message.

According to Example 31, a method that includes any action or combination of actions as substantially described herein in the Detailed Description.

According to Example 32, a method as substantially described herein with reference to each or any combination of the Figures included herein or with reference to each or any combination of paragraphs in the Detailed Description.

According to Example 33, a wireless device configured to perform any action or combination of actions as substantially described herein in the Detailed Description as included in the wireless device.

According to Example 34, a wireless station configured to perform any action or combination of actions as substantially described herein in the Detailed Description as included in the wireless station.

According to Example 35, a non-volatile computer-readable medium that stores instructions that, when executed, cause the performance of any action or combination of actions as substantially described herein in the Detailed Description.

According to Example 36, an integrated circuit configured to perform any action or combination of actions as substantially described herein in the Detailed Description.

Yet another exemplary aspect may include a method, comprising, by a device, performing any or all parts of the preceding Examples.

A yet further exemplary aspect may include a non-transitory computer-accessible memory medium comprising program instructions which, when executed at a device, cause the device to implement any or all parts of any of the preceding Examples.

A still further exemplary aspect may include a computer program comprising instructions for performing any or all parts of any of the preceding Examples.

Yet another exemplary aspect may include an apparatus comprising means for performing any or all of the elements of any of the preceding Examples.

Still another exemplary aspect may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device comprising:
   an antenna;
   a radio operably coupled to the antenna; and
   a processor operably coupled to the radio, wherein the wireless device is configured to:
   transmit, to a first network via the radio, a multi-subscriber identity module (SIM) capability message indicating that the wireless device supports using multiple SIM cards to establish multiple connections to wireless networks;
   connect to the first wireless network based on a first SIM card;
   connect to a second wireless network based on a second SIM card;
   determine that a multi-SIM related issue has occurred;
   transmit, to the first wireless network via the radio, a first wireless device assistance information message, the first wireless device assistance information message based on the determined multi-SIM related issue;
   receive, via the radio, a first radio resource control (RRC) reconfiguration message from the first wireless network based on the first wireless device assistance information message;
   transmit, to the first wireless network via the radio, a second wireless device assistance information message, the second wireless device assistance information message including a delta configuration change;
   receive, via the radio, a second RRC reconfiguration message from the first wireless network based on the second wireless device assistance information message
   transmit, to the first wireless network via the radio, a third wireless device assistance information message, the third wireless device assistance information message including an indication to stop the delta configuration change; and
   receive, via the radio, a third RRC reconfiguration message from the first wireless network based on the first wireless device assistance information message.

2. The wireless device of claim 1, wherein the multi-SIM capability message is transmitted to the first wireless network via the radio in an attach request message or a registration request message.

3. The wireless device of claim 1, wherein the multi-SIM capability message is transmitted to the first wireless network via the radio in a capability report to the first wireless network.

4. The wireless device of claim 3, wherein the wireless device is further configured to receive, from the first wireless network via the radio, a capability enquiry, and wherein the capability report is transmitted in response to the capability enquiry.

5. The wireless device of claim 1, wherein the wireless device is configured to generate the multi-SIM capability message by determining whether the wireless device can receive a first transmission associated with a first SIM card concurrently with a second transmission associated with a second SIM card, and wherein the multi-SIM capability message includes an indication whether the wireless device can receive the first transmission concurrently with the second transmission.

6. The wireless device of claim 1, wherein the multi-SIM capability message includes an indication of one or more types of wireless networks that are supported for each SIM card.

7. The wireless device of claim 1, wherein the multi-SIM capability message includes an indication that the wireless device can connect to multiple different wireless networks.

8. The wireless device of claim 1, wherein the wireless device is further configured to start a first prohibit timer associated with the first wireless device assistance information message.

9. The wireless device of claim 8, wherein the wireless device is further configured to:
   receive a fourth radio resource control (RRC) reconfiguration message from the first wireless network via the radio;
   stop the first prohibit timer; and
   reconfigure the connection with the first wireless network based on the fourth RRC reconfiguration message.

10. The wireless device of claim 8, wherein the wireless device is further configured to:
    determine that the first prohibit timer has ended; and
    transmit, to the first wireless network via the radio, a fourth wireless device assistance information message.

11. The wireless device of claim 10, wherein the wireless device is further configured to repeat the steps of determining that the first prohibit timer has ended and transmitting the fourth wireless device assistance information message via the radio until a maximum retry number is reached.

12. The wireless device of claim 8, wherein the wireless device is further configured to:
    determine that the first prohibit timer has ended;
    transmit, to the second wireless network via the radio, a fourth wireless device assistance information message; and
    start a second prohibit timer associated with the fourth wireless device assistance information message.

13. The wireless device of claim 12, wherein the wireless device is further configured to:
    receive a fourth radio resource control (RRC) reconfiguration message from the second wireless network via the radio;
    stop the second prohibit timer; and
    reconfigure the connection with the second wireless network based on the fourth RRC reconfiguration message.

14. The wireless device of claim 1, wherein determining that a multi-SIM related issue has occurred comprises determining that a first paging occasion associated with the first wireless network overlaps a second paging occasion associated with the second wireless network.

15. The wireless device of claim 1, wherein determining that a multi-SIM related issue has occurred comprises determining that a first frequency band with the first wireless network overlaps with a second frequency band associated with the second wireless network.

16. The wireless device of claim 1, wherein the multi-SIM capability message includes an indication that the wireless device can connect a same wireless network multiple times.

17. A wireless communication method, comprising:
transmitting, to a first wireless network, a multi-subscriber identity module (SIM) capability message indicating that a wireless device supports using multiple SIM cards to establish multiple connections to wireless networks;
connecting to the first wireless network based on a first SIM card;
connecting to a second wireless network based on a second SIM card;
determining that a multi-SIM related issue has occurred;
transmitting, to the first wireless network, a first wireless device assistance information message, the first wireless device assistance information message based on the determined multi-SIM related issue;
receiving a first radio resource control (RRC) reconfiguration message from the first wireless network based on the first wireless device assistance information message;
transmitting, to the first wireless network, a second wireless device assistance information message, the second wireless device assistance information message including a delta configuration change;
receiving a second RRC reconfiguration message from the first wireless network based on the second wireless device assistance information message;
transmitting, to the first wireless network, a third wireless device assistance information message, the third wireless device assistance information message including an indication to stop the delta configuration change; and
receiving a third RRC reconfiguration message from the first wireless network based on the first wireless device assistance information message.

18. An integrated circuit configured to perform a wireless communication method, comprising:
causing a multi-subscriber identity module (SIM) capability message indicating that a wireless device supports using multiple SIM cards to establish multiple connections to wireless networks to be transmitted to a first wireless network;
connecting to the first wireless network based on a first SIM card;
connecting to a second wireless network based on a second SIM card;
determining that a multi-SIM related issue has occurred;
transmitting, to the first wireless network, a first wireless device assistance information message, the first wireless device assistance information message based on the determined multi-SIM related issue;
receiving a first radio resource control (RRC) reconfiguration message from the first wireless network based on the first wireless device assistance information message;
transmitting, to the first wireless network, a second wireless device assistance information message, the second wireless device assistance information message including a delta configuration change;
receiving a second RRC reconfiguration message from the first wireless network based on the second wireless device assistance information message;
transmitting, to the first wireless network, a third wireless device assistance information message, the third wireless device assistance information message including an indication to stop the delta configuration change; and
receiving a third RRC reconfiguration message from the first wireless network based on the first wireless device assistance information message.

19. The integrated circuit of claim 18, wherein the multi-SIM capability message is transmitted to the first wireless network in an attach request message or a registration request message.

* * * * *